(12) United States Patent
Eppers et al.

(10) Patent No.: US 6,481,371 B1
(45) Date of Patent: Nov. 19, 2002

(54) GUTTER AND FLUSHING SYSTEM FOR MILKING PARLORS

(75) Inventors: Paul A. Eppers, Madison, WI (US); Josh J. Vrieze, Madison, WI (US)

(73) Assignee: DEC International, Inc., Madison, WI (US)

(*) Notice: Subject to any disclaimer, the term of this patent is extended or adjusted under 35 U.S.C. 154(b) by 0 days.

(21) Appl. No.: 09/880,370

(22) Filed: Jun. 13, 2001

(51) Int. Cl.[7] .................................................. A01J 3/00
(52) U.S. Cl. ..................................... 119/14.03; 119/161
(58) Field of Search .......................... 119/14.03, 14.1, 119/14.19, 14.51, 53, 27, 63, 161, 51.11

(56) References Cited

U.S. PATENT DOCUMENTS

| | | | |
|---|---|---|---|
| 4,207,837 A | * 6/1980 | Schwartau et al. | 119/14.03 |
| 4,508,059 A | * 4/1985 | Anderson | 119/14.03 |
| 4,513,687 A | * 4/1985 | De Jong | 119/14.03 |
| 4,854,268 A | * 8/1989 | Kipe | 119/14.03 |
| 5,203,280 A | 4/1993 | Nelson | |
| 5,285,746 A | * 2/1994 | Moreau | 119/14.03 |
| 5,507,247 A | * 4/1996 | Tecza et al. | 119/14.03 |
| 5,718,185 A | * 2/1998 | Pichler et al. | 119/14.04 |

FOREIGN PATENT DOCUMENTS

EP              035206 A1 * 7/1994 ............ A01K/1/01

* cited by examiner

*Primary Examiner*—Peter M. Poon
*Assistant Examiner*—Andrea M. Valenti
(74) *Attorney, Agent, or Firm*—Andrus, Sceales, Starke & Sawall, LLP

(57) ABSTRACT

A milking parlor (70) has a flushing channel (122) along a zigzag rump rail (124) for flushing cow manure (108) therealong. The rump rail is a continuous tubular conduit having upper portions thereof (146) cut-out (148) at end segments (132, 134, 136) to provide open-top gutter channels (138) receiving manure therein and interdigitated with closed-top flow channels (140) in side segments (126, 128, 130) conducting and passing the manure.

27 Claims, 9 Drawing Sheets

GUTTER AND FLUSHING SYSTEM FOR MILKING PARLORS

BACKGROUND AND SUMMARY

The invention relates to milking parlors having a zigzag or S-shaped rump rail, such as herringbone milking parlors and parabone milking parlors, and more particularly to a gutter and flushing system therefor.

Various types of milking parlors are known in the prior art for milking a plurality of cows. Parallel type parlors, herringbone type parlors, and parabone type parlors have an operator pit extending along a longitudinal axis and have a plurality of stalls on one or both lateral sides of the pit. In a parallel parlor, the stalls are perpendicular to the noted axis. In herringbone and parabone parlors, the stalls extend diagonally relative to the noted axis. In another type of parlor known as a rotary parlor, the cows stand on a rotating circulating platform, with the stalls extending radially or diagonally relative to the central axis of rotation of the platform, and with the operator pit along the outer or inner circumference or arcuate portion of the platform. In all of these parlors, there is a need to collect and flush manure from the cows.

In all of the noted types of parlors, one known way of removing manure is a deck flush system in which jets of water spray the manure away from the cow deck. Another known system in all of the noted types of parlors installs a gutter in the floor or deck for collecting manure, which gutter may then be flushed. The gutter is typically covered by a grate through which the manure may fall and then be flushed. A problem with these systems is that the manure often splatters off the deck or floor and can reach both the operator and the milking equipment such as the milking cluster and teatcups. Another problem is with the grates because they flex, which can make the cows uncomfortable standing and/or walking on the grates, which in turn causes the cows to load into the stalls slower and also tends to make the cows stand unsteady in the stall, which in turn causes slips, squawks and kickoffs of the teatcup inflation liner. Another problem arises because during milking preparation a fore strip is taken from the cow's udder, most of which fore strip ends up below the grates, where the operator is not able to check for mastitis.

Alternatively to the noted floor gutter system, it is known in the prior art to provide parallel parlors and parallel type rotary parlors with an elevated gutter. In the parallel parlor, the gutter is a straight member extending along the noted longitudinal axis. In the parallel type rotary parlor, the gutter is arcuate along a radius. The gutter is typically located at the rump rail and along the bottom of the splash plate.

Elevated gutters have not been provided in herringbone, herringbone type rotary, and parabone parlors. This has caused problems in some states which require a gutter system, which in turn creates a dilemma for the dairyman desiring to construct a herringbone, herringbone type rotary, or parabone parlor. In such states, the dairyman desiring a herringbone, herringbone type rotary, or parabone parlor must accept the noted trade-off of floor gutter grates and deck flush.

The present invention addresses and solves the noted dilemma.

BRIEF DESCRIPTION OF THE DRAWINGS

Prior Art

Present Invention

Figure 8:
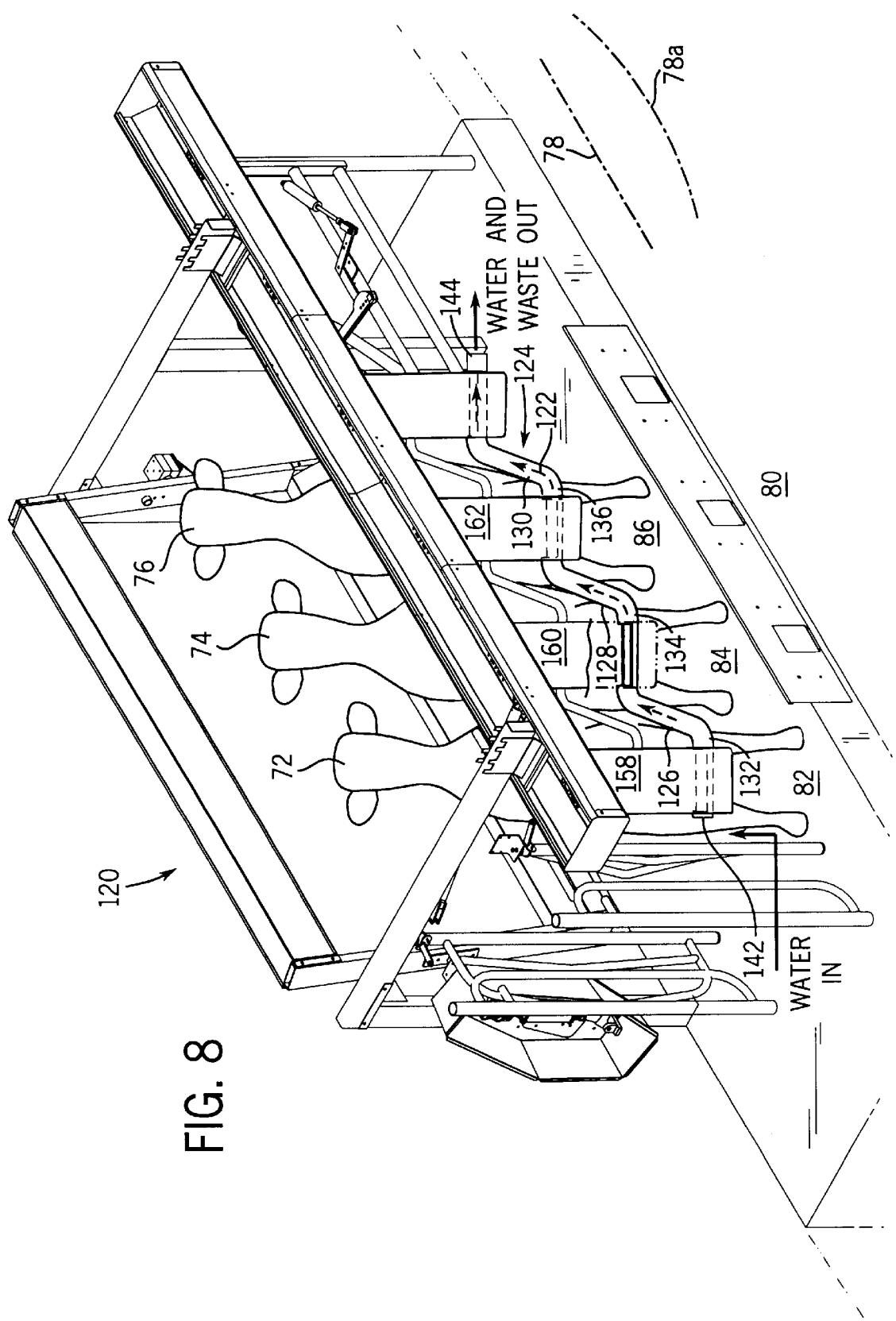

FIG. 8 is a perspective view of a milking parlor in accordance with the present invention.

Figure 9:
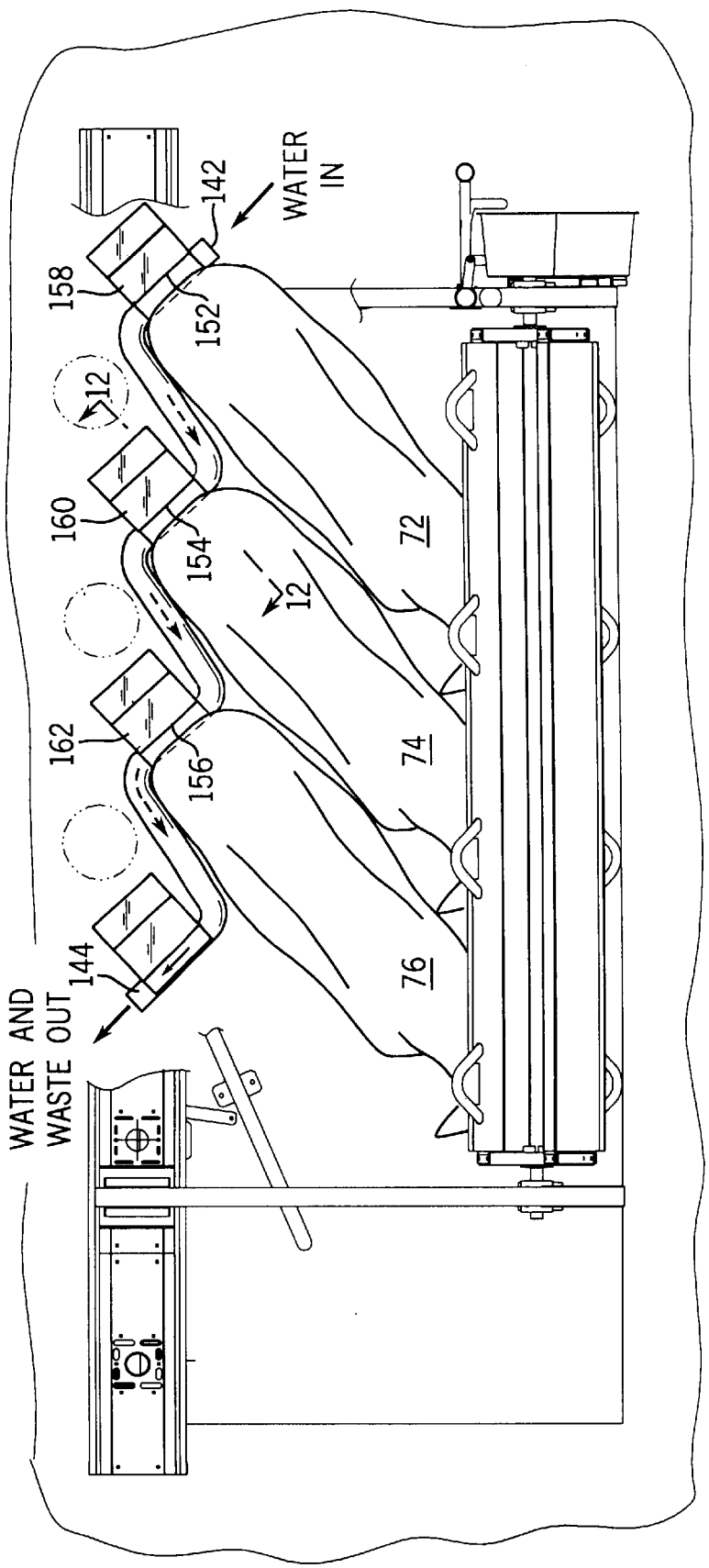

FIG. 9 is a top view of the parlor of FIG. 8.

Figure 10:
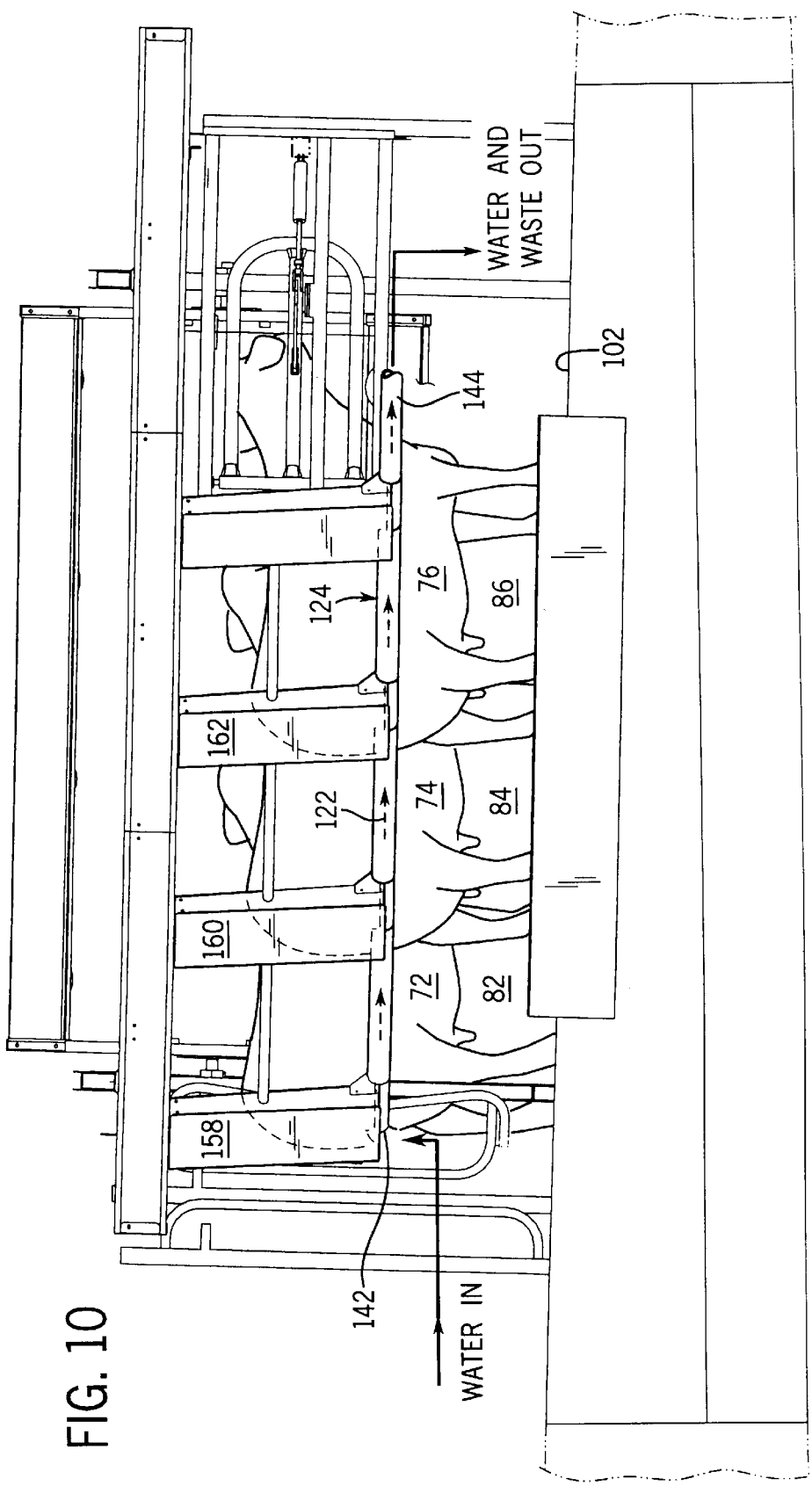

FIG. 10 is a side view of the parlor of FIG. 8.

Figure 11:
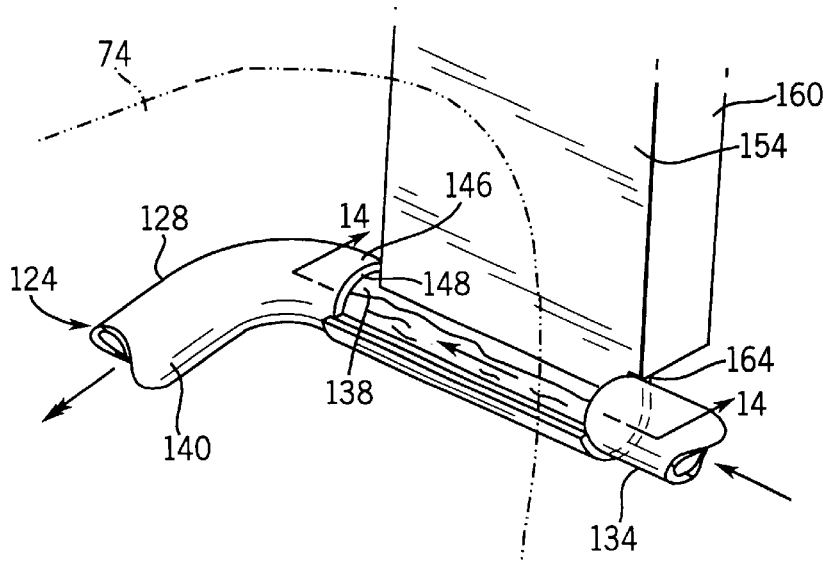

FIG. 11 is a perspective view of a portion of the parlor of FIG. 8.

Figure 12:
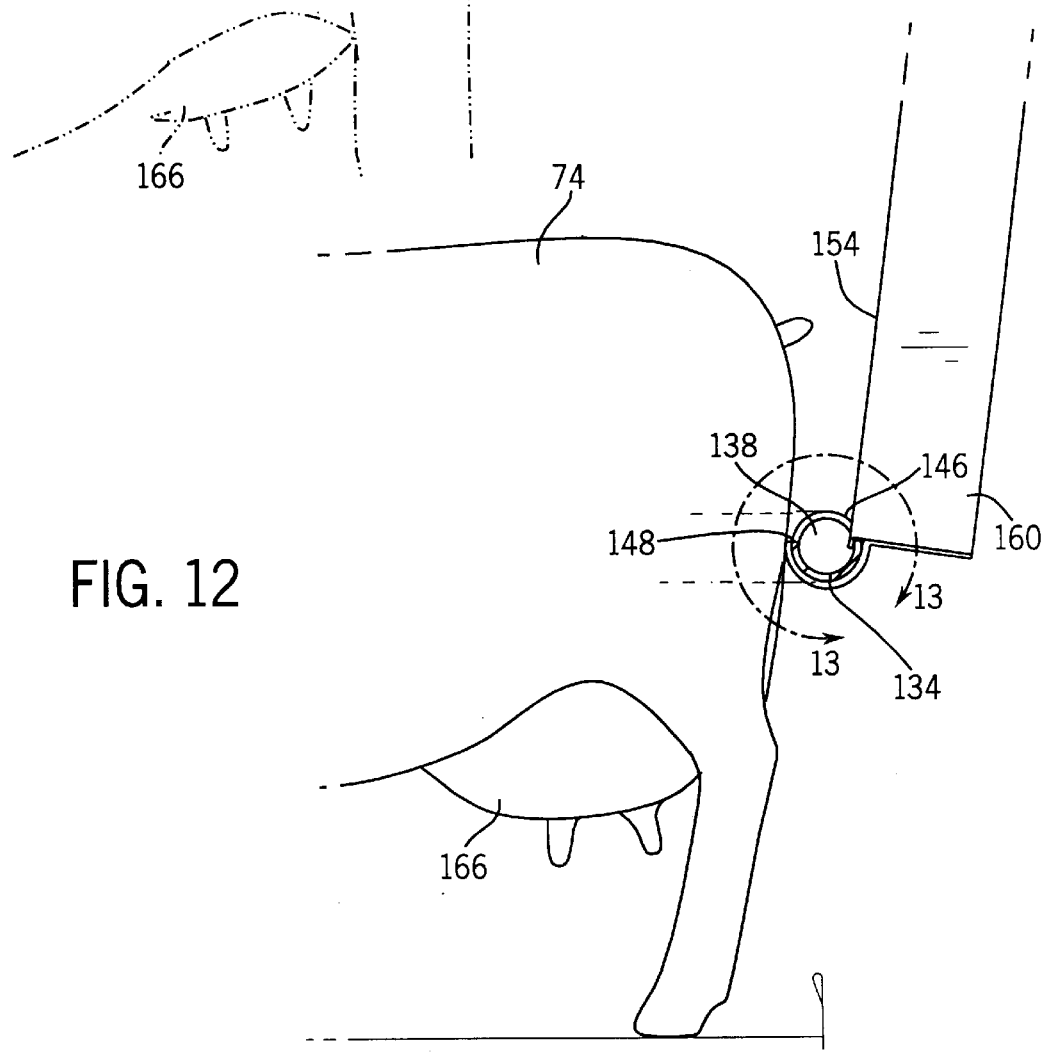

FIG. 12 is a view taken along line 12—12 of FIG. 9.

Figure 13:
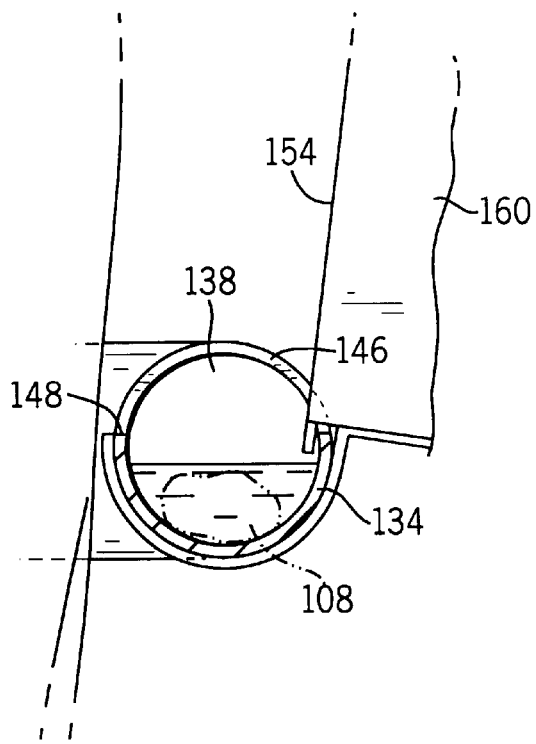

FIG. 13 is an enlarged view of a portion of FIG. 12 taken along line 13—13.

Figure 14:
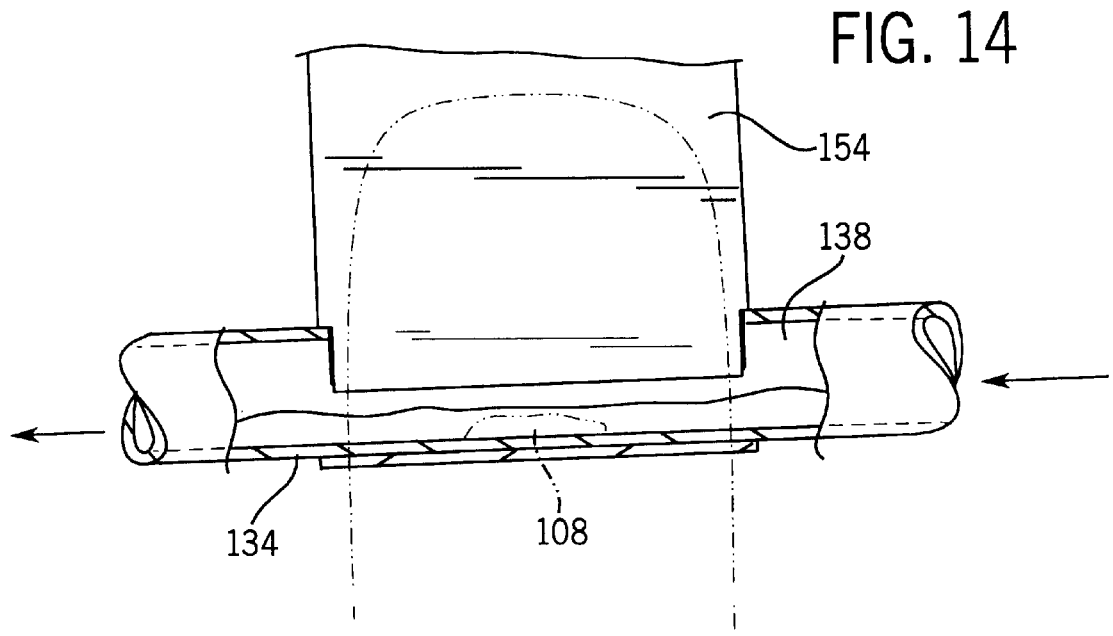

FIG. 14 is a view taken along line 14—14 of FIG. 11.

DETAILED DESCRIPTION

Prior Art

Figure 1:
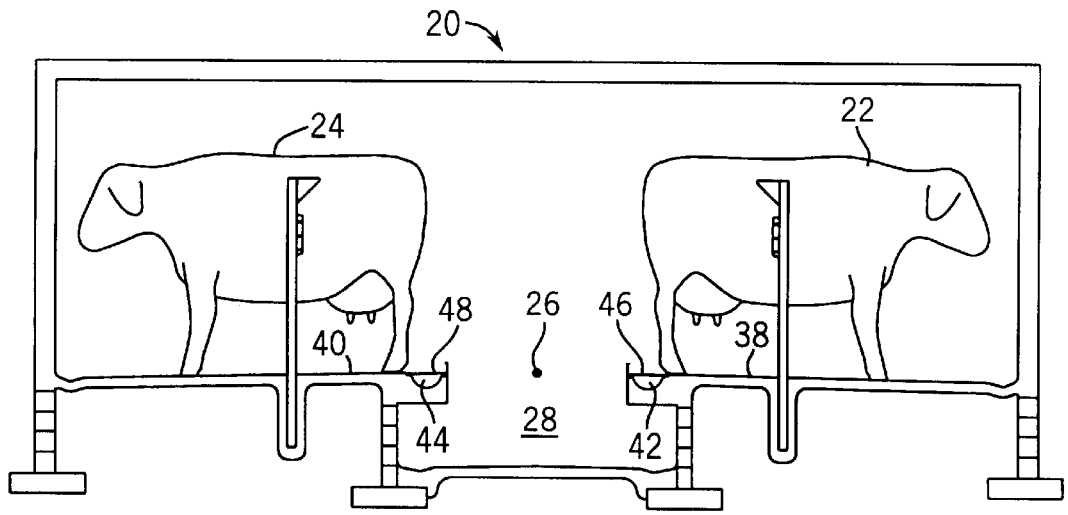
FIG. 1 is an end view of a parallel type milking parlor known in the prior art.

FIG. 1 shows a parallel milking parlor 20 known in the prior art for milking a plurality of cows 22, 24 etc. The parlor extends along a longitudinal axis 26, which axis extends into the plane of the page in FIG. 1, and is shown at 26 in perspective view in FIG. 4. Operator pit 28 extends longitudinally along such axis. A plurality of milking stalls such as 32, 34, 36 etc. are provided on one or both lateral sides of operator pit 28 and extend perpendicularly to axis 26. In FIG. 1, floors or decks 38 and 40 of the parlor have respective gutters 42 and 44 formed therein for collecting manure, which gutters are covered by respective grates 46 and 48.

Figure 2:
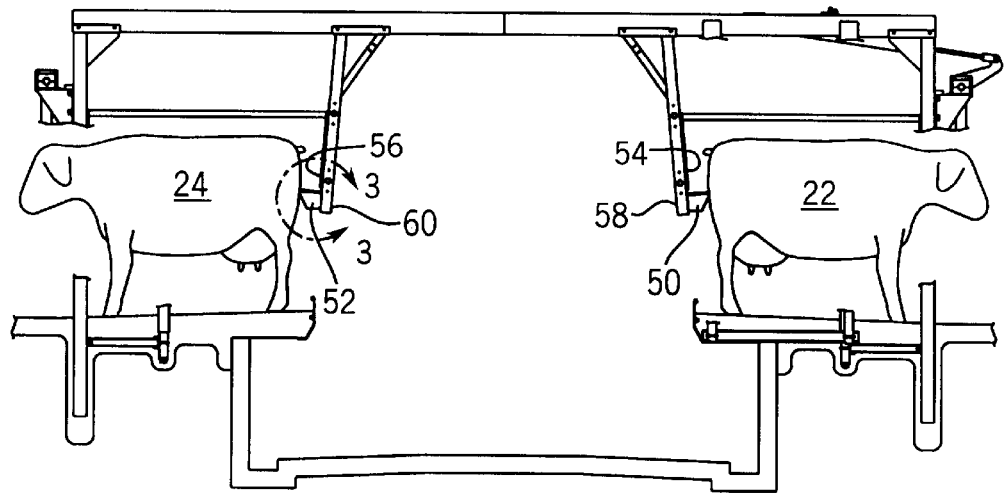
FIG. 2 is an end view of another parallel milking parlor known in the prior art.
Figure 3:
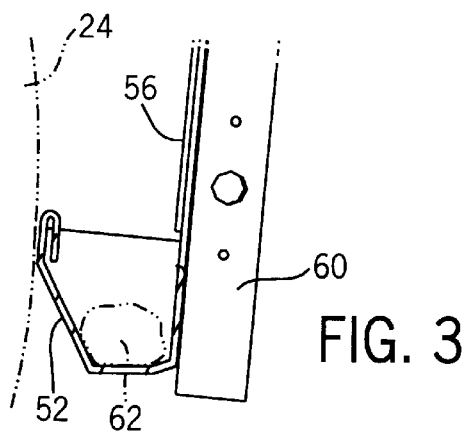
FIG. 3 is an enlarged view of a portion of FIG. 2 taken along line 3—3.
Figure 4:
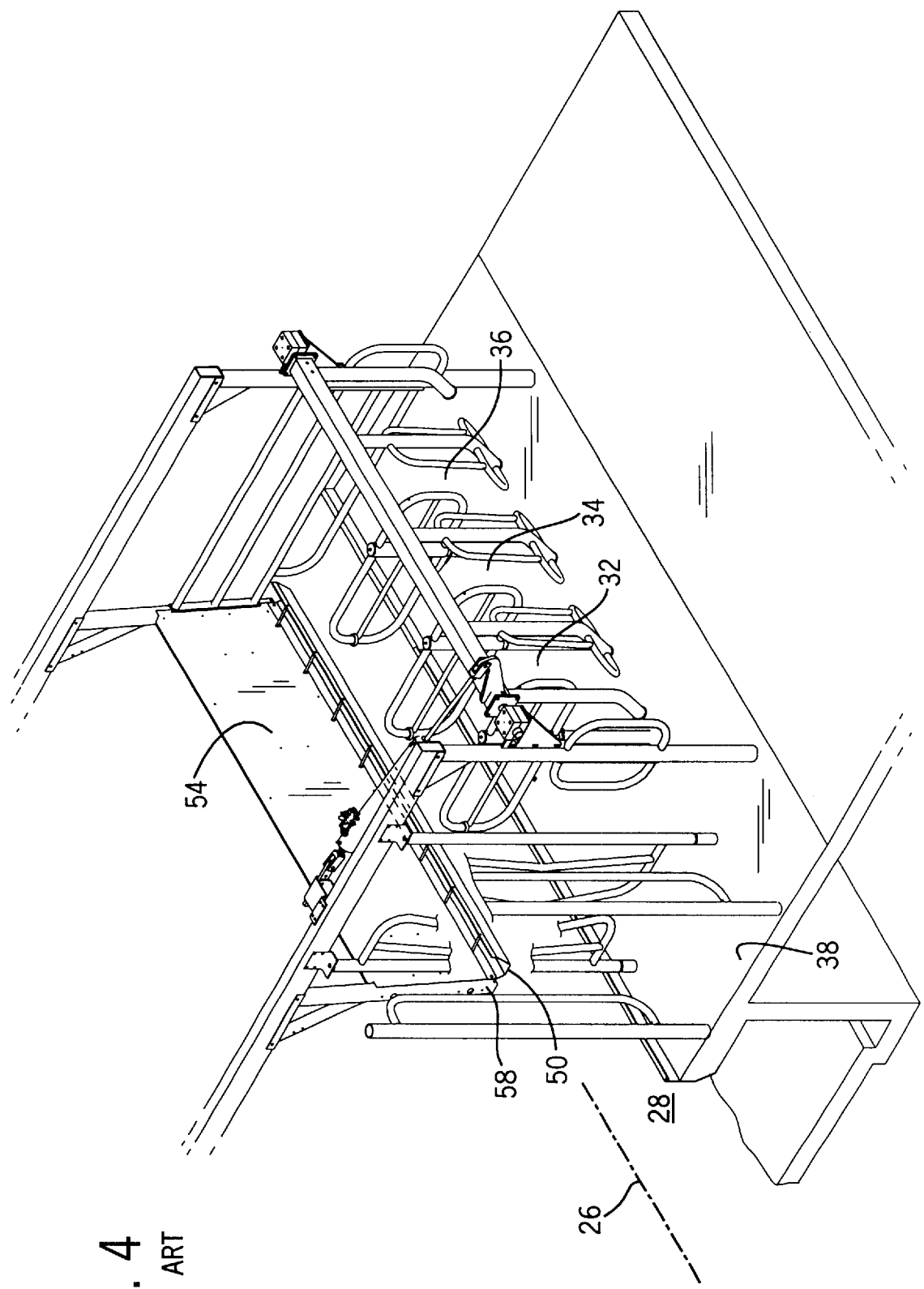
FIG. 4 is a perspective view of a portion of the parlor of FIG. 2.

FIG. 2 is like FIG. 1 and shows another embodiment and uses like reference numerals where appropriate to facilitate understanding. In FIGS. 2–4, floor gutters 42 and 44 are eliminated, and are replaced by gutters 50 and 52 at the lower ends of splash plates 54 and 56 on rump rails 58 and 60. The gutters collect manure 62, FIG. 3.

Figure 5:
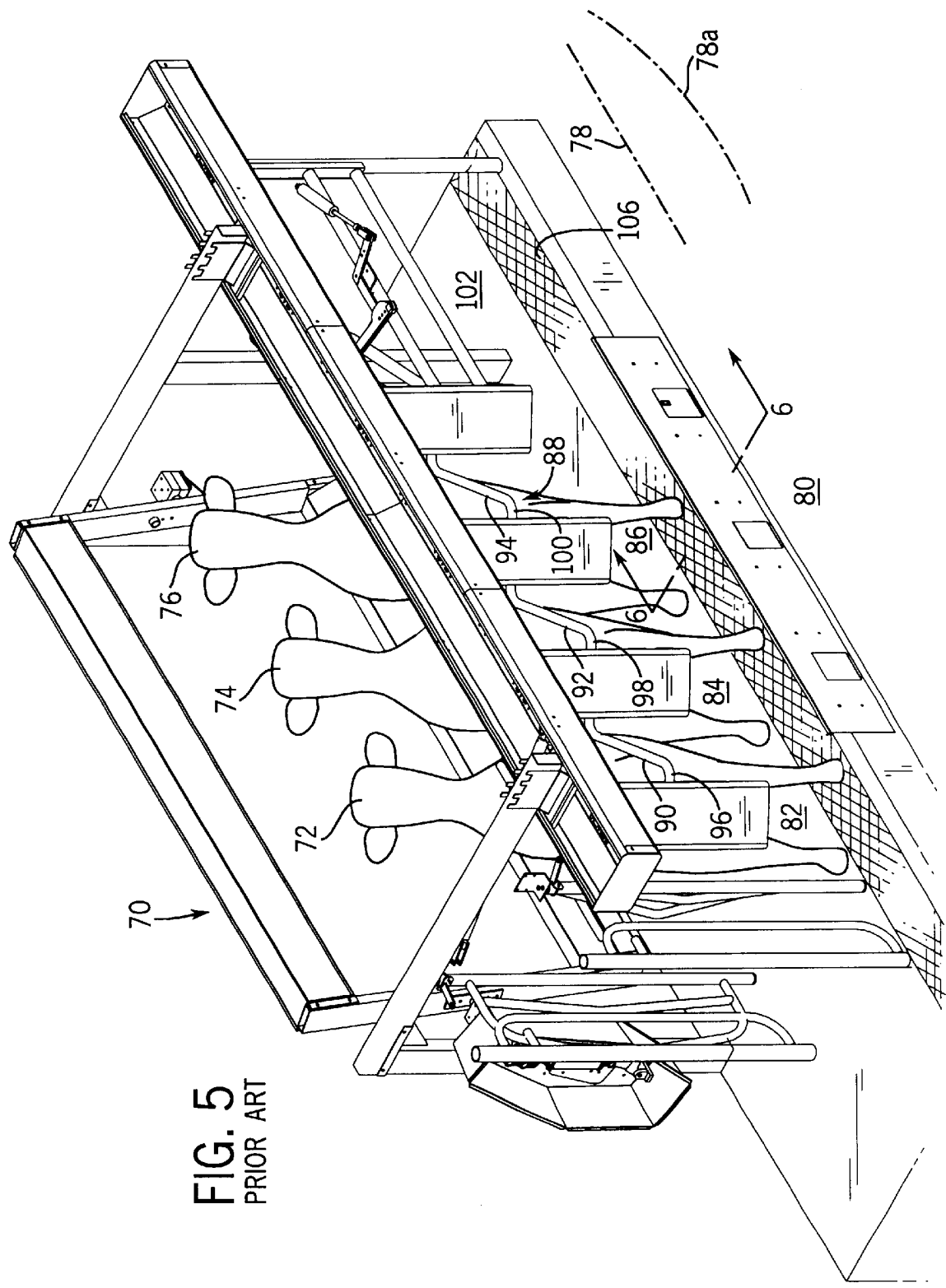
FIG. 5 is a perspective view of a herringbone type milking parlor known in the prior art.

FIG. 5 shows a herringbone milking parlor 70 for milking a plurality of cows 72, 74, 76 etc. The parlor extends along an axis 78 and has an operator pit 80 extending along such axis. In a herringbone parlor, axis 78 extends longitudinally rectilinearly as shown in FIG. 5. In a herringbone type rotary parlor, the axis extends along an outer or inner circumference as shown at 78a. The parlor has a plurality of stalls 82, 84, 86 etc. on one or both lateral sides of operator pit 80 and extending diagonally relative to axis 78. A zigzag or S-type rump rail 88 has a plurality of diagonally extending side segments 90, 92, 94 etc., each along a side of a respective stall 82, 84, 86 etc., and a plurality of end segments 96, 98, 100, etc., interdigitated with the side segments and extending laterally relative thereto. Side segments 90, 92, 94, etc. extend along the sides of the cows 72, 74, 76, etc., respectively. End segments 96, 98, 100, etc. extend along the rump ends of the cows 72, 74, 76, etc., respectively. This construction is known in the prior art, for example U.S. Pat. No. 5,203,280 incorporated herein by reference. A parabone milking parlor is similar but with a greater diagonal angle relative to axis 78, i.e. in a parabone parlor, the diagonal direction of the cows lies somewhere between the 90° angle of a parallel parlor relative to axis 78 and the diagonal angle of the cows in a herringbone parlor relative to axis 78.

Figure 6:
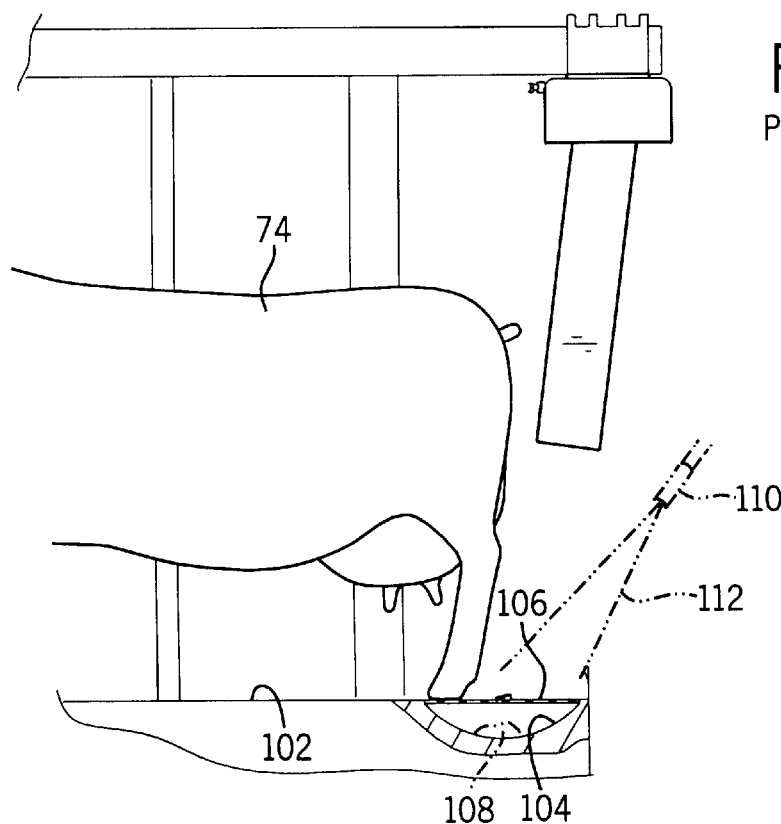
FIG. 6 is a view of a portion of the parlor of FIG. 5 taken along line 6—6.
Figure 7:
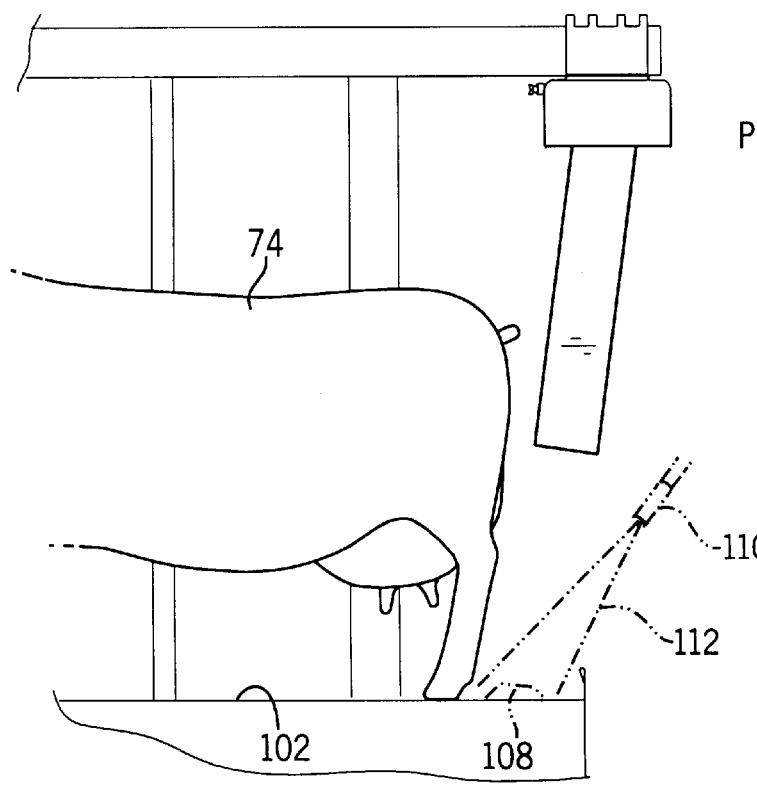
FIG. 7 is a like FIG. 6 and shows another embodiment.

Floor 102, FIGS. 5, 6 of milking parlor 70 has a gutter 104 covered by a grate 106 through which manure 108 may pass as flushed by hose 110 spraying flushing fluid such as water 112, all as is known. Continued flushing also rinses gutter 104. Alternatively, the gutter may be eliminated, FIG. 7, and the deck or floor 102 simply flushed and rinsed by hose 110.

Present Invention

FIGS. 8–14 illustrate the present invention and use like reference numerals from above where appropriate to facilitate understanding.

Milking parlor 120 has a flushing channel 122 provided along a zigzag or S-type rump rail 124 having a plurality of diagonally extending side segments 126, 128, 130, etc. each along a side of a respective stall 82, 84, 86 etc., and a plurality of end segments 132, 134, 136, etc., interdigitated with side segments 126, 128, 130, etc., respectively, and extending laterally relative thereto. Side segments 126, 128, 130, etc., extend along the sides of the cows 72, 74, 76, etc., respectively. End segments 132, 134, 136, etc., extend along the rump ends of the cows 72, 74, 76, etc., respectively.

End segments 132, 134, 136, etc. provide gutter channels, for example gutter channel 138, FIGS. 11–14, receiving cow manure 108 therein. Side segments 126, 128, 130, etc., are flow channels, for example flow channel 140, FIG. 11, interdigitated with the gutter channels and conducting and passing the manure. Zigzag rump rail 124 has an inlet 142, FIGS. 8–10, for receiving flushing fluid such as water, and an outlet 144 for discharging flushing fluid and manure and any other waste. The interdigitated gutter channels at 132, 134, 136 and flow channels at 126, 128, 130 form a continuous flushing channel 122 for flushing manure along zigzag rump rail 124 to outlet 144. Inlet 142 is preferably gravitationally above outlet 144, FIG. 10, for drainage. In FIG. 10, deck or floor 102 is sloped downwardly from left to right such that the flushing water runs downhill from inlet 142 to outlet 144. The inlet and outlet may be reversed, such that the inlet flush may start at either end of the milking parlor. When the inlet and outlet are reversed from that shown in FIG. 10, the slope of floor or deck 102 is also reversed to slope downwardly from right to left such that the flushing water will flow downhill from the right inlet to the left outlet. Multiple inlets and outlets may be provided, and may be desirable in larger parlors as well as rotary parlors to be able to handle larger quantities of water and manure.

Zigzag rump rail 124 is a continuous tubular conduit, through which manure 108 is flushed. Upper portions of the conduit such as 146, FIGS. 11–13, are cut-out as shown at 148 at end segment 134 to provide open-top gutter channel 138 receiving cow manure 108 therein. The side segments, 126, 128, 130, etc. are not cut-out and provide closed-top flow channels such as 140 formed by tubular conduit 124 in communication with open-top gutter channels 138 and interdigitated therewith. Open-top gutter channels 138, as provided at end segments 132, 134, 136, and closed-top flow channels 140, as provided at side segments 126, 128, 130, form continuous flow channel 122 for flushing manure at 108 through zigzag rump rail 124.

Gutter channels 138 at the noted end segments preferably extend along respective splash plates 152, 154, 156 along the backsides of respective cabinets 158, 160, 162 which are already existent in known herringbone and parabone parlors. Splash plates 152, 154, 156, etc., each extend along a rump end of a respective stall 82, 84, 86, etc., and extend laterally relative to the noted diagonal direction. The splash plates extend downwardly to respective lower ends such as 164, FIG. 11, spaced above the cow's udder 166, FIG. 12. Gutter channels such as 138 are preferably at the lower end 164 of the splash plate. Flow channels such as 140 conduct and pass the manure. The manure from gutter channels 138 and the flushing fluid from inlet 142 flow along and through rump rail 124 including through gutter channels 138 at end segments at 132, 134, 136, etc., and through flow channels 140 at side segments 126, 128, 130, etc.

It is recognized that various equivalents, alternatives and modifications are possible within the scope of the appended claims.

What is claimed is:

1. A milking parlor for milking a plurality of cows, said parlor extending along an axis and having a plurality of stalls extending diagonally relative to said axis, a zigzag rump rail having a plurality of diagonally extending side segments each along a side of a respective stall, and a plurality of end segments interdigitated with said side segments and extending laterally relative thereto, said side segments extending along the sides of the cows, said end segments extending along the rump ends of the cows, a flushing channel along said zigzag rump rail for flushing cow manure therealong, said flushing channel extending in zigzag manner such that said manure is flushed in zigzag manner along said rump rail.

2. The invention according to claim 1 wherein said end segments of said zigzag rump rail comprise gutter channels receiving cow manure therein, and said side segments of said zigzag rump rail comprise flow channels interdigitated with said gutter channels and conducting and passing said manure.

3. The invention according to claim 2 where zigzag rump rail has at least one inlet for receiving flushing fluid and at least one outlet for discharging flushing fluid and manure, said interdigitated gutter channels and flow channels forming a continuous zigzag said flushing channel for flushing said manure along said zigzag rump rail to said outlet.

4. A milking parlor for milking a plurality of cows, said parlor extending along an axis and having a plurality of stalls extending diagonally relative to said axis, a zigzag rump rail having a plurality of diagonally extending side segments each along a side of a respective stall, and a plurality of end segments interdigitated with said side segments and extending laterally relative thereto, said side segments extending along the sides of the cows, said end segments extending along the rump ends of the cows, a flushing channel along said zigzag rump rail for flushing cow manure therealong, wherein said end segments of said zigzag rump rail comprise gutter channels receiving cow manure therein, and said side segments of said zigzag rump rail comprise flow channels interdigitated with said gutter channels and conducting and passing said manure, said zigzag rump rail has at least one inlet for receiving flushing fluid and at least one outlet for discharging flushing fluid and manure, said interdigitated gutter channels and flow channels forming a continuous said flushing channel for flushing said manure along said zigzag rump rail to said outlet, and said inlet is gravitationally above said outlet.

5. The invention according to claim 1 wherein said zigzag rump rail is a continuous tubular conduit, and wherein said manure is flushed through said conduit.

6. The invention according to claim 1 wherein said axis extends longitudinally rectilinearly.

7. The invention according to claim 1 wherein said axis extends along a circumference.

8. A milking parlor for milking a plurality of cows, said parlor extending along an axis and having a plurality of stalls extending diagonally relative to said axis, a zigzag rump rail having a plurality of diagonally extending side segments each along a side of respective stall, and a plurality of end segments interdigitated with said side segments and extending laterally relative thereto, said side segments extending along the sides of the cows, said end segments extending along the rump ends of the cows, said end segments comprising gutter channels receiving cow manure therein and flushing said manure in zigzag manner along a first direction along said end segments and in a second different direction along said side segments.

9. The invention according to claim 8 comprising a plurality of splash plates each along a rump end of a respective stall and extending laterally relative to said diagonal direction, wherein said gutter channels extend along said splash plates.

10. The invention according to claim 9 wherein each said splash plate extends downwardly to a lower end spaced above the cow's udder, and wherein said gutter channel of said end segment of zigzag rump rail is at said lower end of said splash plate.

11. The invention according to claim 8 wherein said side segments of said zigzag rump rail comprise flow channels conducting and passing manure.

12. The invention according to claim 11 wherein said side segment flow channels are interdigitated with and in communication with said end segment gutter channels and form a continuous channel therewith.

13. The invention according to claim 12 wherein said zigzag rump rail has at least one inlet for receiving flushing fluid, and at least one outlet for discharging flushing fluid and manure, wherein said manure from said gutter channels and said flushing fluid from said inlet flow along said rump rail including through said gutter channels and said flow channels.

14. The invention according to claim 8 wherein said milking parlor is a herringbone parlor.

15. The invention according to claim 8 wherein said milking parlor is a parabone parlor.

16. The invention according to claim 8 wherein said milking parlor is a herringbone type rotary parlor.

17. A milking parlor for milking a plurality of cows, said parlor extending along an axis and having a plurality of stalls extending diagonally relative to said axis, a zigzag rump rail having a plurality of diagonally extending side segments each along a side of respective stall, and a plurality of end segments interdigitated with said side segments and extending laterally relative thereto, said side segments extending along the sides of the cows, said end segments extending along the rump ends of the cows, said rump rail comprising a continuous tubular conduit having upper portions thereof cut-out at said end segments to provide open-top gutter channels receiving cow manure therein and flushing said manure in zigzag manner along a first direction along said open-top gutter channels along said end segments and in a second different direction along said side segments.

18. The invention according to claim 17 wherein said side segments comprise closed-top flow channels formed by said tubular conduit in communication with open-top gutter channels and interdigitated therewith.

19. The invention according to claim 18 wherein said open-top gutter channels and said closed-top flow channels form a continuous channel for flushing said cow manure through said zigzag rump rail.

20. A method of making a gutter for a milking parlor for milking a plurality of cows, said parlor extending along an axis and having a plurality of stalls extending diagonally relative to said axis, said method comprising providing a zigzag continuous tubular conduit rump rail having a plurality of diagonally extending side segments each along a side of a respective stall, and a plurality of end segments interdigitated with said side segments and extending laterally relative thereto, said side segments extending along the sides of the cows, said end segments extending along the rump ends of the cows, said method further comprising cutting out upper portions of said zigzag continuous tubular conduit rump rail at said end segments to provide open-top gutter channels for receiving cow manure therein and flushing said manure in zigzag manner along a first direction along said open-top gutter channels along said end segments and in a second different direction along said side segments.

21. The method according to claim 20 comprising leaving said side segments uncut to provide said side segments as closed-top flow channels formed by said tubular conduit in communication with said open-top gutter channels and interdigitated therewith.

22. The method according to claim 21 comprising providing said open-top gutter channels and said closed-top flow channels as a continuous channel, and flushing said manure through said continuous channel through said zigzag rump rail.

23. A method for flushing a milking parlor for milking a plurality of cows, said parlor extending along an axis and having a plurality of stalls extending diagonally relative to said axis, a zigzag rump rail having a plurality of diagonally extending side segments each along a side of a respective stall, and a plurality of end segments interdigitated said side segments and extending laterally relative thereto, said side segments extending along the sides of the cows, said end segments extending along the rump ends of the cows, said method comprising flushing cow manure along said rump rail in zigzag manner.

24. The method according to claim 23 comprising providing said zigzag rump rail as a continuous tubular conduit, and flushing said manure through said conduit.

25. The method according to claim 23 comprising:
providing said end segments of said zigzag rump rail as gutter channels;
receiving cow manure in said gutter channels;
providing said side segments of zigzag rump rail as flow channels;
interdigitating said gutter channels and said flow channels; and
conducting and passing said manure through said flow channels and said gutter channels.

26. The method according to claim 25 comprising:
providing said zigzag rump rail with at least one inlet for receiving flushing fluid;
providing zigzag rump rail with at least one outlet for discharging flushing fluid and manure;
forming said interdigitated gutter channels and flow channels as a continuous flushing channel;
introducing flushing fluid at said inlet and flushing said manure through said continuous flushing channels along said zigzag rump rail to said outlet.

27. A method for flushing a milking parlor for milking a plurality of cows, said parlor extending along an axis and having a plurality of stalls extending diagonally relative to said axis, a zigzag rump rail having a plurality of diagonally extending side segments each along a side of a respective stall, and a plurality of end segments interdigitated said side segments and extending laterally relative thereto, said side segments extending along the sides of the cows, said end segments extending along the rump ends of the cows, said method comprising flushing cow manure along said rump rail in zigzag manner, and comprising:

provproviding said end segments of said zigzag rump rail as gutter channels;

receiving cow manure in said gutter channels;

providing said side segments of zigzag rump rail as flow channels;

interdigitation said gutter channels and said flow channels;

conducting and passing said manure through said flow channels and said gutter channels;

providing said zigzag rump rail with at least one inlet for receiving flushing fluid;

providing zigzag rump rail with at least one outlet for discharging flushing fluid and manure;

forming said interdigitated gutter channels and flow channels as a continuous flushing channel;

introducing flushing fluid at said inlet and flushing said manure through said continuous flushing channels along said zigzag rump rail to said outlet; and providing said inlet gravitationally above said outlet.

* * * * *